US009246383B2

(12) United States Patent
Brewster

(10) Patent No.: US 9,246,383 B2
(45) Date of Patent: Jan. 26, 2016

(54) SYSTEM AND METHOD FOR INPUT VOLTAGE REGULATION OF SWITCH MODE SUPPLIES IMPLEMENTING BURST MODE OPERATION

(71) Applicant: Linear Technology Corporation, Milpitas, CA (US)

(72) Inventor: Richard A. Brewster, West Boylston, MA (US)

(73) Assignee: Linear Technology Corporation, Milpitas, CA (US)

( * ) Notice: Subject to any disclaimer, the term of this patent is extended or adjusted under 35 U.S.C. 154(b) by 188 days.

(21) Appl. No.: 13/646,571

(22) Filed: Oct. 5, 2012

(65) Prior Publication Data

US 2014/0097814 A1 Apr. 10, 2014

(51) Int. Cl.
G05F 5/00 (2006.01)
H02M 3/156 (2006.01)

(52) U.S. Cl.
CPC .................... H02M 3/156 (2013.01)

(58) Field of Classification Search
USPC ......... 323/205, 207, 209, 222, 271, 282–285; 320/137, 160–164
See application file for complete search history.

(56) References Cited

U.S. PATENT DOCUMENTS

| 4,272,806 | A | * | 6/1981 | Metzger ..................... 363/21.17 |
| 4,937,728 | A | | 6/1990 | Leonardi |
| 7,030,596 | B1 | * | 4/2006 | Salerno et al. ................ 323/282 |
| 7,755,342 | B2 | * | 7/2010 | Chen et al. .................... 323/283 |
| 7,990,120 | B2 | | 8/2011 | Leonard et al. |
| 8,410,764 | B2 | * | 4/2013 | Scaldaferri et al. ........... 323/282 |
| 8,487,595 | B2 | * | 7/2013 | Popescu et al. ............... 323/280 |
| 2003/0231012 | A1 | * | 12/2003 | Corva et al. .................... 323/285 |
| 2007/0075695 | A1 | * | 4/2007 | Gan et al. ....................... 323/282 |
| 2008/0018314 | A1 | * | 1/2008 | Sheng et al. ................... 323/285 |
| 2008/0111517 | A1 | * | 5/2008 | Pfeifer et al. .................. 320/101 |
| 2008/0157723 | A1 | * | 7/2008 | Xing et al. ..................... 320/164 |
| 2010/0176773 | A1 | * | 7/2010 | Capel ............................. 323/266 |
| 2014/0002043 | A1 | * | 1/2014 | Li et al. ......................... 323/282 |
| 2014/0152239 | A1 | * | 6/2014 | Yao et al. ....................... 320/107 |

FOREIGN PATENT DOCUMENTS

| EP | 1779212 A2 | 5/2007 |
| TW | 200827969 A | 7/2008 |
| WO | 2011/019588 A1 | 2/2011 |

OTHER PUBLICATIONS

Bentolila., "Step-Down Switching Regulator Light-Load Efficiency Improvement Using Recycled Parasitic Energy, and Gate Voltage Clamping" A thesis presented to the graduate school of the University of Florida in partial fulfillment of the requirements for the degree of master of science, Univerity of Florida, 2002.

(Continued)

*Primary Examiner* — Nguyen Tran
(74) *Attorney, Agent, or Firm* — McDermott Will & Emery LLP

(57) ABSTRACT

Switching regulator methods and systems are provided for supplying output current at a regulated voltage level to a load. Upon determining that the output current is not below a predetermined current threshold, the regulator is operated in a continuous mode. The input voltage is monitored. If the input voltage is not below a first input threshold level, the system remains in continuous mode. Otherwise, the system enters a burst mode in which the switch mode power supply is turned OFF, thereby reducing transistor gate charge losses.

28 Claims, 4 Drawing Sheets

(56) References Cited

OTHER PUBLICATIONS

"A Fresh Approach to Switching Regulator Topologies and Implementations", Global Power Seminar 2006, Fairchild Semiconductor.

"Harnessing Solar Power with Smart Power-Conversion Techniques", Application Note 484, Dec. 1, 2000, Maxim Integrated.

Taiwanese Office Action with Search Report dated Sep. 1, 2015 issued in Taiwanese Patent Application No. 102135876 (English translation).

* cited by examiner

SYSTEM AND METHOD FOR INPUT VOLTAGE REGULATION OF SWITCH MODE SUPPLIES IMPLEMENTING BURST MODE OPERATION

TECHNICAL FIELD

This disclosure generally relates to the electrical arts, and more particularly to voltage regulation of power supplies with burst mode operation.

DESCRIPTION OF RELATED ART

In recent years there has been an effort to improve the efficiency of power transfer from a power source to a load via voltage regulators. Voltage regulators are power supply circuits that provide a predetermined and substantially constant output voltage, even while using an input voltage source which may be poorly specified. Furthermore, many electronic products use voltage regulators to convert an input voltage into a regulated output voltage that may be higher or lower than the input voltage. Accordingly, voltage regulators may function as both a voltage converter and a voltage stabilizer.

There are two major categories of regulators, namely linear regulators and switching regulators. For example, in linear regulator, the output voltage may be regulated by adjusting a passive element (e.g., a variable resistor) to control a continuous flow of current from the voltage source to the load.

On the other hand, switching regulators, are essentially DC-DC converters that operate by switching current ON and OFF to control the output voltage. Switching regulators may employ one or more switching devices, along with an inductor and a capacitor in order to store and transfer energy to a load. Such regulators control the voltage supplied to the load by turning the switching element(s) ON and OFF, thereby regulating the amount of power being transmitted through the inductor in the form of discrete current pulses. For example, the inductor and the capacitor convert the supplied current pulses into a substantially constant load current such that the load voltage is regulated. Accordingly, regulation of the output voltage may be achieved through the ON-OFF duty cycle adjustment of the switching element(s), based on feedback signals indicative of the output voltage and load current.

For many applications, switching regulators that operate in a current-mode are particularly desirable. For example, current-mode switching regulators can provide good line and load transient signal rejection, and can offer inherent current-limiting capabilities during fault conditions (e.g., output short circuits). Further, some conventional current-mode switching regulators monitor the inductor current and compare it with a peak inductor current level to determine when it is appropriate to turn OFF the main switching element, thereby eliminating the supply of excess current.

One type of regulator that often operates in current-mode is a synchronous switching regulator. Synchronous switching regulators have a main switching element and a synchronous switching element which are driven out-of-phase with respect to each other in order to supply current at a regulated voltage level to a load.

Switching regulators typically provide greater efficiency in power transfer than linear regulators. The efficiency of switching regulators, however, may vary and is not always maximized. For example, as the power requirements of the load diminish (e.g., the regulator approaches its regulation point), the ON pulse width may become narrower and the efficiency in power transfer degrades. Even as the load power requirement decreases, a fixed amount of power is dissipated in the drive circuitry despite the load size.

The foregoing loss of efficiency at lighter loads is common in switching regulators that operate in a forced continuous mode of operation. In forced continuous mode, the efficiency loss at lighter loads for switching regulators becomes greater because the main switch is periodically turned ON and OFF regardless of operating conditions. Thus, these regulators may become inefficient for lighter loads because of the energy (e.g., in the form of gate charge) that is required to constantly turn the main switch and synchronous switch ON and OFF, is independent of load conditions. Further, at lighter loads, the regulator may become erratic and even skip pulses, which may have undesirable consequences.

Techniques exist to reduce these losses and effects. For example, one way to alleviate the inefficiency for lighter loads of the forced continuous mode is to allow the regulator to enter a burst mode operation. In burst mode operation, the regulator may omit switching cycles when the load is light, thereby reducing transistor gate charge losses. When operating in burst mode, the active switching elements (e.g., the switching transistor(s)) and possibly other components of the regulator circuit that are not needed are kept OFF (e.g., sleep mode) as the load current drops below a predetermined value. In a synchronous switching regulator, both the main and synchronous switching elements may be kept OFF during sleep mode. In a non-synchronous switching regulator, the main switching element may be kept OFF. Thus, burst mode operation may be used to reduce switching losses in a switching regulator and increase the operating efficiency at low output current levels.

For conventional burst mode switching regulators, burst mode operation generally occurs in response to regulator output conditions (e.g., voltage load). For example, the current control loop is interrupted when the output voltage rises above a first predetermined level, thereby allowing the regulator to enter a sleep mode. The sleep mode prevents additional power to be transferred to the load. Exit from the sleep mode occurs when the regulator output voltage falls below a second predetermined value (e.g., the second predetermined value may be higher than the first predetermined value). Thus, entry to and exit from sleep mode for burst mode switching regulators is a function of the output voltage conditions.

Difficulties arise in controlling burst mode switching regulators when the output voltage level is substantially constant. For example, the regulator may be charging a battery. Since the battery provides a substantially constant voltage level that is independent of charge current, conventional monitoring of the output voltage of the regulator is not feasible. Furthermore, the power source may be limited in capacity or may be fluctuating. For example, the power source may be a solar cell, where the maximum power that can be transferred to the load may vary with ambient conditions.

In view of the foregoing, it would be desirable to provide circuits and methods for providing efficient power transfer to a load whose output voltage does not vary quickly with changes in charge current. It would also be desirable to provide circuits and methods for providing efficient power transfer to a load, wherein the decision to enter to and exit from burst mode operation includes a consideration of the power source output conditions.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION OF ILLUSTRATIVE EMBODIMENTS

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

The various examples discussed below relate to efficient power transfer from a power source to a load. In one aspect, a switching regulator regulates the power transfer between a power source that may fluctuate, and load whose output voltage does not vary quickly with changes in charge current. Efficiency is enhanced through burst mode operation to reduce switching losses in the regulator and to increase the operating efficiency when the input to the regulator provides low power.

Figure 1:
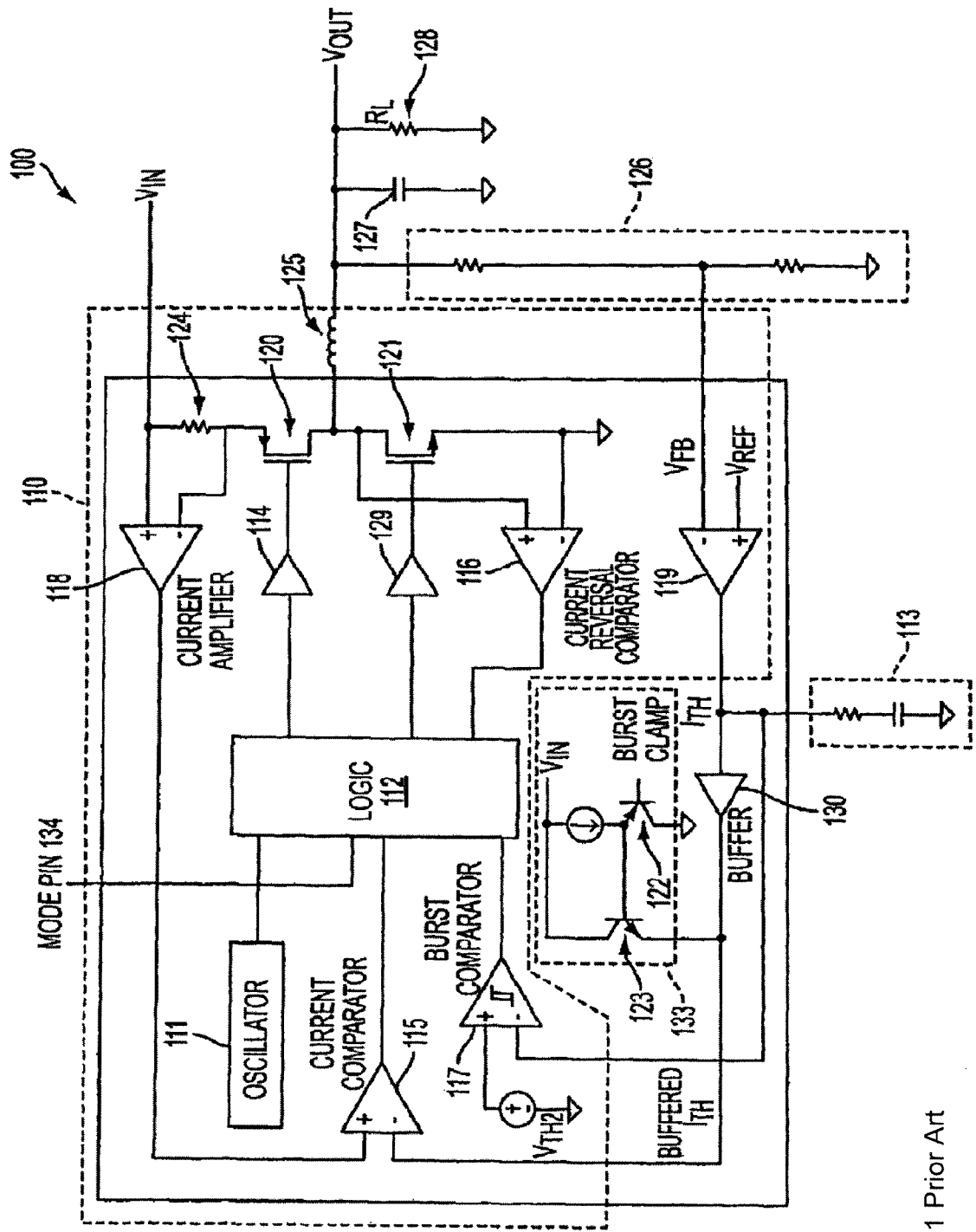
FIG. 1 is an illustrative circuit diagram of a conventional step-down switching voltage regulator.

Reference now is made in detail to the examples illustrated in the accompanying drawings and discussed below. FIG. 1 illustrates a conventional, step-down (buck) switching voltage regulator using a constant-frequency, current-mode control architecture.

Voltage regulator 100 of FIG. 1 comprises control circuitry 110, which incorporates oscillator 111 or any other suitable device capable of providing the circuit with switch timing (by generating a narrow pulse at a constant frequency). At the beginning of each cycle this oscillator pulse propagates through logic 112, which then directs main switch driver 114 to turn main switch 120 ON. Logic 112 may comprise a pulse-width modulator (PWM) circuit or any other suitable circuit capable of driving switch drivers 114 and 129 to control the duty cycle of main power switch 120 (i.e., the amount of time switch 120 is ON compared to the period of an ON/OFF cycle). This forces a voltage of approximately VIN-VOUT across inductor 125. As a result, the current through inductor 125 increases linearly, and a greater amount of current is supplied to capacitor 127 and the load (modeled by resistor 128). When main switch 120 is ON, the inductor current flows through sense resistor 124 and develops a sense voltage across it that is equal to the product of the inductor current and the sense resistor value. This voltage is then amplified by current amplifier 118. When the amplified sense voltage increases above the voltage on the inverting input of current comparator 115 (i.e., on the buffered $I_{TH}$ input), current comparator 115 trips and signals logic 112 to cause drivers 114 and 129 to turn main switch 120 OFF and synchronous switch 121 ON, respectively. This changes the voltage across inductor 125 to approximately −VOUT, causing the inductor current to decrease until the next oscillator pulse once again turns main switch 120 ON and synchronous switch 121 OFF.

The voltage on the buffered $I_{TH}$ input controls the minimum peak inductor current at which current comparator 115 shuts main switch 120 OFF. Error amplifier 119, which may comprise a differential amplifier, a transconductance amplifier, or any other suitable amplifier, adjusts the voltage on $I_{TH}$ by comparing the feedback signal from resistor divider 126 to a reference voltage $V_{REF}$. The $I_{TH}$ signal is then stabilized by compensation circuit 113, preferably comprising a resistor and a capacitor, and coupled to the inverting input of current comparator 115 through voltage buffer 130. If a large load step is applied to voltage regulator 100, the load current drawn from regulator 100 increases. This causes a reduction in the feedback voltage $V_{FB}$ relative to $V_{REF}$. Error amplifier 119 raises the $I_{TH}$ voltage until the average inductor current matches the new load current. Conversely, if the load current decreases, it causes an increase in the feedback voltage $V_{FB}$ relative to $V_{REF}$. This causes error amplifier 119 to decrease the $I_{TH}$ voltage. As a result, although main switch 121 continues to switch ON at the same frequency (i.e., at the beginning of each cycle), its duty cycle is decreased, and, therefore, it conducts less current as the load current decreases. This process continues until the average inductor current is equal to the new load current.

The regulator of FIG. 1 permits a user to select between two modes of operation for the switching regulator through use of external MODE selection input pin 134. The first mode of operation is forced continuous operation, which reduces noise, RF interference, and output voltage ripple. In forced continuous operation, the inductor current is allowed to become negative. When main switch 120 shuts OFF, synchronous switch 121 turns ON. The synchronous switch remains ON until the next oscillator pulse triggers the main switch to turn ON. The second mode of operation is burst mode, in which main switch 120 and synchronous switch 121 operate intermittently at light loads. This provides greater efficiency than forced continuous operation by reducing transistor gate charge losses at light loads.

In burst mode operation, current reversal comparator 116 is enabled and the inductor current is not allowed to become negative. The current reversal comparator monitors the current flowing through synchronous switch 121 and signals logic 112 to shut OFF the synchronous switch when the inductor current undergoes a current reversal condition. In the embodiment of FIG. 1, the current reversal condition indicates when current crosses the zero current level. However, one of ordinary skill in the art will appreciate that the scope of the present invention includes other current reversal conditions, e.g., to indicate that current is about to or already has crossed the zero current level. For example, a voltage offset may be applied to the inverting input of comparator 116 so that comparator 116 trips right before the inductor or switch current crosses the zero current threshold.

During burst mode, transistors 122 and 123 of clamp circuitry 133 clamp the minimum value of the buffered $I_{TH}$ voltage at the burst threshold level, thereby setting the minimum peak inductor current level, $I_{burst}$. The $I_{TH}$ voltage then is monitored by burst comparator 117 to determine when sleep mode is enabled and disabled. When main switch 120 turns ON, the inductor current has to increase to minimum peak inductor current level $I_{burst}$ before it can shut OFF. Then, as the output load current drops, the peak inductor current decreases to keep the output voltage in regulation. When the load current demanded drops to a current less than $I_{burst}$ minus half of the ripple current in the inductor, the burst threshold forces the peak inductor current to remain equal to $I_{burst}$. Since the average inductor current is greater than the load current, error amplifier 119 reduces the $I_{TH}$ voltage until burst comparator 117 trips. When the burst comparator trips, sleep mode is enabled and both switches 120 and 121, along with predetermined components of the remaining circuitry, are shut OFF to reduce power consumption. At this point, the load current is solely supplied by output capacitor 127. When the output voltage drops, the voltage on $I_{TH}$ increases above a level that is set by the hysteresis of burst comparator 117 and un-trips burst comparator 117. Sleep mode is de-asserted, all circuitry is turned ON, and normal operation is resumed.

A disadvantage of the circuit in FIG. 1 is that when the output voltage $V_{OUT}$ is substantially fixed (e.g., when the regulator is charging a battery) the regulator 100 cannot determine whether/when to enter into burst mode. That is because the load (e.g., battery) provides a substantially fixed voltage load irrespective of the charge current, the regulator 100. Furthermore, regulator 100 cannot accommodate a power source to VIN that is limited or fluctuating (e.g., solar cell). Accordingly, when the power conditions at the input VIN change, the regulator does not know when/whether to enter burst mode, ultimately resulting in a power transfer to the output VOUT that is not optimized for efficiency.

Figure 2:
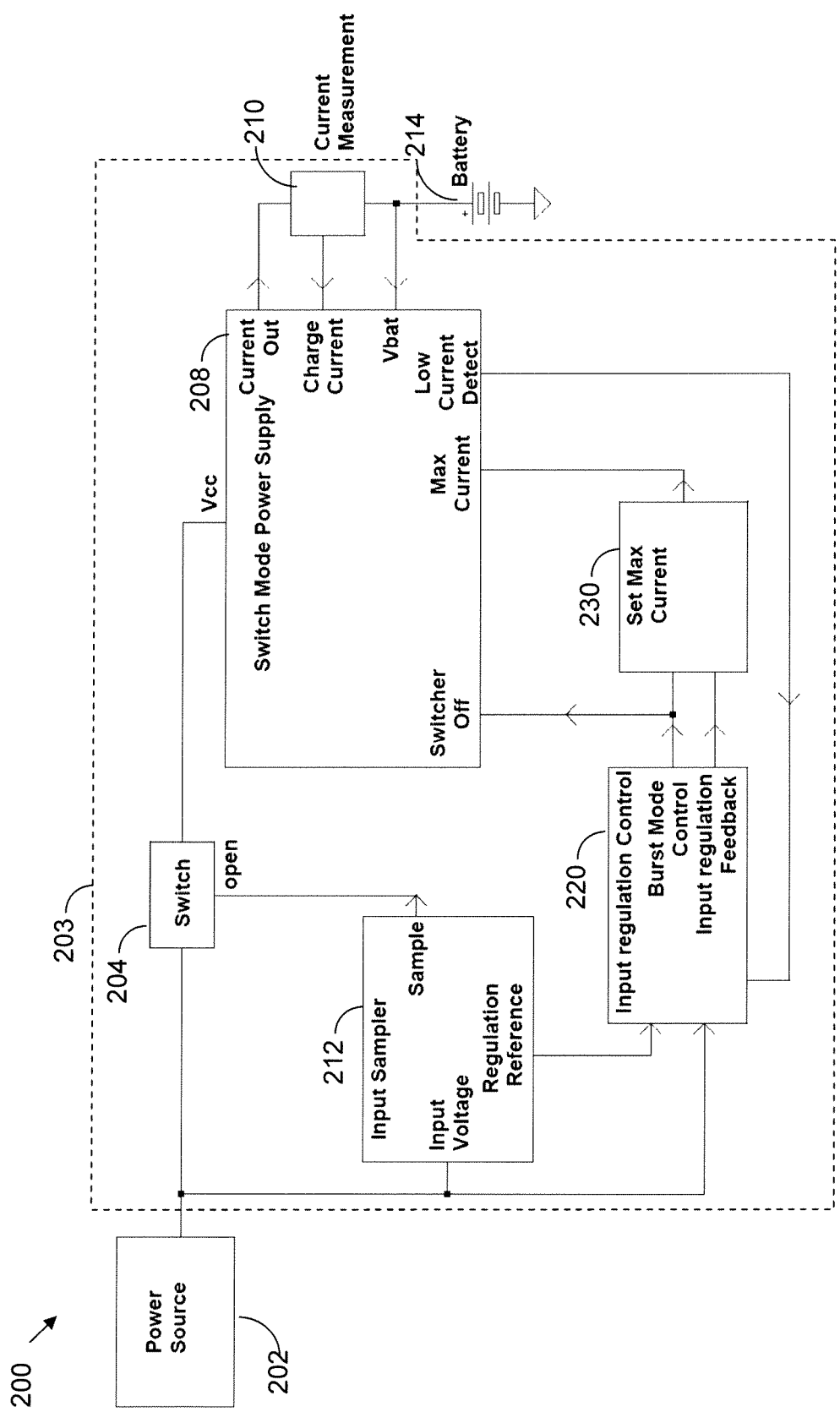
FIG. 2 is a block diagram of a switching regulator consistent with an embodiment of the present invention.

FIG. 2 is a block diagram of a switching regulator consistent with an embodiment of the present invention. The switching regulator 203 supplies output current at a regulated voltage to a load 214 (a battery in this example). The switching regulator 203 includes an input node coupled to a power source 202. In one embodiment, the power source 202 is a solar panel. An input switch 204 is coupled between the input node and the switch mode power supply 208. The switch mode power supply 208 is coupled to the load 214, which may be a battery. A current measurement element 210 measures the current drawn by the load 214. In one embodiment, the current measurement element 210 is a sense resistor (discussed in more detail in a later section). In one embodiment, the switching regulator 203 includes input sampling circuit 212 that is configured to control the switch 204. The input switch 204 is configured to isolate the switch mode power supply 208 from the input node. For example, the input sampling circuit 212 may open the switch 204 to be able to determine the open circuit voltage at the input of the switching regulator 203 (e.g., unperturbed by the rest of the switching regulator). The input sampling circuit 212 may close the switch to provide a closed circuit measurement of the input voltage. The difference between the closed circuit measurement and the reference voltage as determined by the open circuit measurement is used to determine when to exit burst mode operation. For example, when the closed circuit measurement is a predetermined threshold above the reference voltage after sampling, then the open circuit voltage burst mode operation is exited.

In one embodiment, the input sampling circuit includes a digital to analog converter (DAC) sample and hold circuit, an open circuit amplifier having a first input coupled to an output of the DAC sample and hold circuit, and a second input operatively coupled to the input node. The Input sampling circuit 212 may further include a clock coupled to an input of the DAC sample and hold circuit. These elements will be clarified in a subsequent section.

The switch mode power supply 208 may include one or more output switches that are configured to turn ON/OFF the output current to the load 214. Further, it may include an inductor configured to provide the output current to the load 214 (although a switched capacitor topology may be used instead of the inductor). It will be understood that different topologies, such as boost, buck, buck/buck boost, etc. can be used. The operation of a switching regulator will not be explained in detail as it will be readily understood by one skilled in the art.

The switching regulator 203 may include a control circuit 220 coupled between the input node an the switch mode power supply 208. In one embodiment, control circuit 220 is used for two purposes: (i) to control the maximum current output of the switch mode power supply 208 during MPPC regulation; and (ii) to control the maximum current output and operation of the switch mode power supply 208 during burst mode operation.

The switching regulator 203 may further include a current limit block 230, (e.g., comprising a current limit amplifier configured to impose an artificial voltage across a current limit resistor (discussed in FIG. 3)) to limit the output current (e.g., current provided to the load 214).

Figure 3:
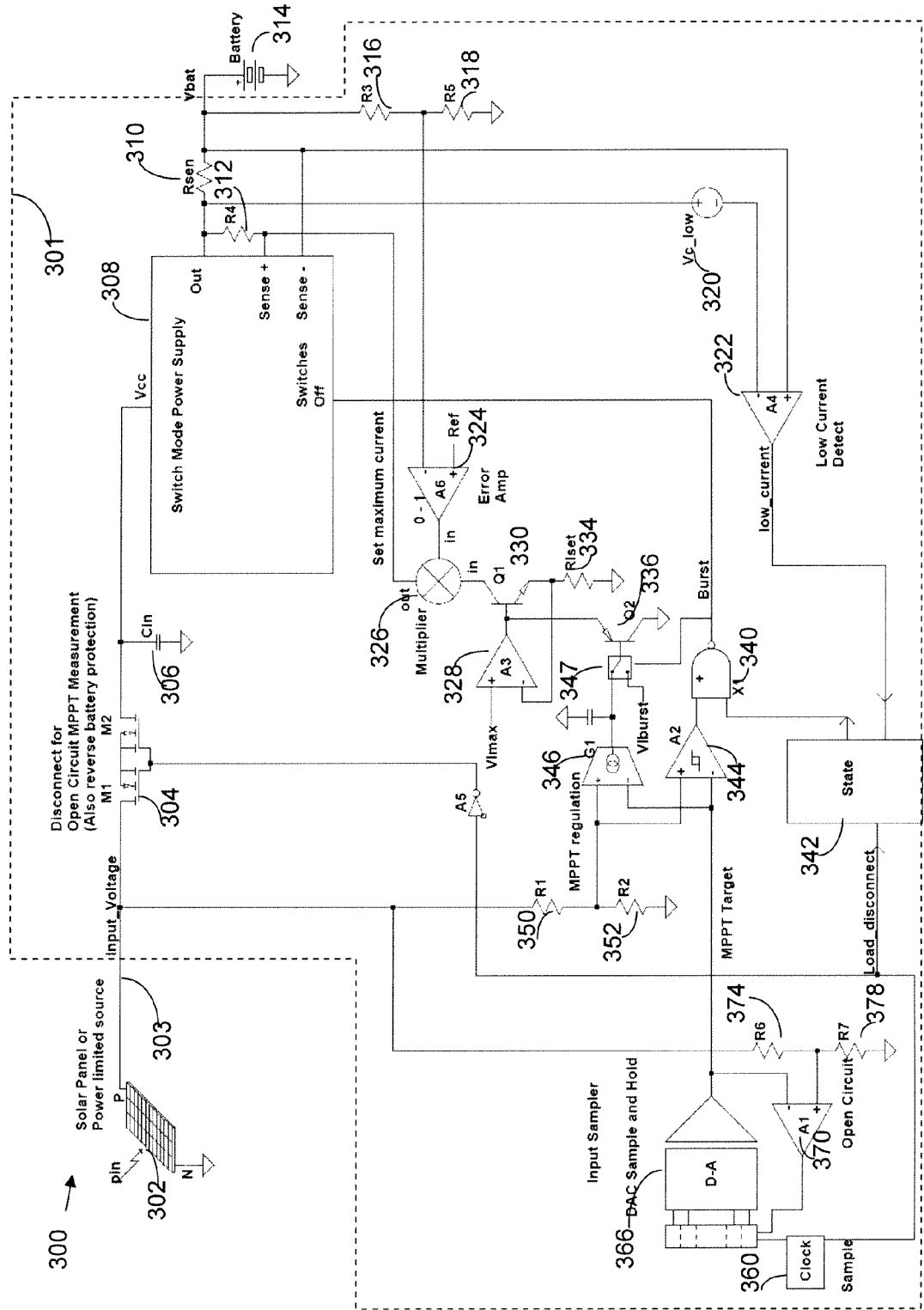
FIG. 3 is a more detailed block diagram of a switching regulator consistent with an embodiment of the present invention.

FIG. 3 is a more detailed block diagram of a switching regulator consistent with an embodiment of the present invention. The input to the switching regulator 301 may be a fluctuating source, such as a solar panel 302. The input voltage from the solar panel is provided to one or more switches 304 (e.g., NFETS 304 and 306), collectively referred to as the "input switch" in this example. Although NFETs are illustrated in the example of FIG. 3, it will be understood that other types of suitable switching elements may be used without departing from the principles embodied herein.

For example, when the input switch 304 is ON current from the solar panel 302 can pass through to the rest of the switching regulator (e.g., via switch mode power supply 308). When the input switch 304 is OFF, the solar panel 302 is isolated from the switching regulator 301. The input switch 302 is generally in ON mode. In one example, the input switch 302 is turned OFF during brief periods when the input voltage is sampled, (which is discussed in a later section). Thus, the input switch 304 allows the regulator to make an open circuit voltage measurement of its input voltage at the input voltage node 303.

In one embodiment, the input sampling block includes a digital to analog converter (DAC) sample and hold circuit 366, an open circuit amplifier 370, input resistors 374 and 378, and a clock 360. For example, the input sampling block, senses the voltage at the input voltage when the input switch is OFF. This sensed open circuit voltage represents the input voltage to the switching regulator 301, unperturbed by the load represented by the switching regulator 301 (i.e., which is different from the load 314). Next, the input voltage is sampled by turning the switch ON (i.e., the input voltage is measured in closed circuit). The difference of the input voltage when the switch is ON versus OFF provides an indication as to whether the switcher should be turned OFF. This is discussed in more detail in a later section.

The output of the input switch is coupled to the switch mode power supply block 308. As noted before, different topologies, such as boost, buck, buck/buck boost, etc. are supported. In this example, a buck topology is implemented. The operation of a switching regulator will not be explained in detail as it will be readily understood by one skilled in the art.

In one embodiment, the switch mode power supply block 308 includes one or more output switches configured to turn ON and OFF current to the load 314. The output of the switch is coupled to an inductor that provides current to a load 314 (e.g., a battery). In one example, the determination on whether to turn the output switches ON or OFF is based on the input signals at the Sense+ and Sense− nodes. In one example, power supply block 308 includes an internal oscillator that is configured to set the output switches chopping frequency. For example, a comparator is used to set the duty cycle of the output switches. The duty cycle is the percentage of the time a switch is ON. Put differently, the ON time is the duty cycle times the period (e.g., 1/frequency).

In the example of FIG. 3, current mode control is used. Accordingly, the sense voltage to nodes Sense+ and Sense− of the switch mode power supply 308 are provided by sense resistor $R_{sen}$ (310). Put differently, the current provided to the battery 314 is sensed by sense resistor $R_{sen}$ (310) and provided to the switch mode power supply 308 via inputs sense+ and sense−. For example, the decision when to turn ON the output switches may be based on this current input. The maximum regulated current may be set via resistor R4 (313), which provides an offset voltage. This offset voltage is provided to a sense amplifier (not explicitly shown but within switch mode power supply 308) monitoring the current that is flowing through the sense resistor $R_{sen}$ (310). In one embodiment, the sense amplifier is a transconductance amplifier. For example, if 50 mV is developed across the current limit resistor R4 (312), the switch mode power supply 308 provides a regulated 50 mV across sense resistor $R_{sen}$ (310) provided the sense amplifier has no offset. When the load (i.e., battery 314 in this example) reaches full capacity, the current through the resistor $R_{sen}$ 310 becomes 0, thereby preventing an overcharge of the battery.

In one example, when the switching regulator 301 approaches regulation, an artificial voltage is imposed across resistor R4 (312) to limit the amount of current. Put differently, if the battery 314 reaches full charge capacity, the amount of charge provided to the load (e.g., battery 314) is limited.

For example, under normal operation (e.g., without maximum power point control (MPPC)) the maximum current is set by current limit amplifier A3 (328), transistor Q1 (330), and resistor $R_{Iset}$ (334) such that the current in resistor R4 (312) is based on $V_{Imax}/R_{Iset}$.

In the example of FIG. 3, a battery 314 is used as a load to the switching regulator 301. Accordingly, the battery 314 may be charged at a constant current until the voltage across the battery 314 approaches a float voltage. For example, when the float voltage is reached the charge current is reduced until the current becomes zero. In one embodiment, this regulation is achieved through error amplifier A6 (324). For example, as the divided down battery voltage approaches a predetermined voltage at node Ref (324) the maximum current set by transistor Q1 (330) and passed to R4 is reduced to zero.

For example, for MPPC regulation, the input voltage at node 303 (provided by solar panel 302) is first disconnected from the switch mode power supply 308, as discussed above. In one embodiment, the switch mode power supply 308 is stopped as well during this input voltage sampling phase (e.g., to conserve power). The input sampling block then samples this voltage. For example, a voltage is created at the positive terminal of the comparator 370, where this voltage is the no load input voltage at input 303 divided down by resistors R6/R7 (374 and 378 respectively). This voltage at the positive terminal of the comparator 370 provides a digital signal indicative of whether the voltage from the input resistor dividers (i.e., 374, 378) is greater than (i.e., output high) or smaller than (i.e., output low) the output of the DAC sample and hold circuit 366. The digital signal (at the positive terminal of the comparator 370) is then loaded into a shift register (not shown) that sets the bits of the DAC to be turned on. After cycling through the possible combinations the voltage at the MPPC Target node is substantially similar to the positive terminal of the comparator 370. For example, the voltage at the MPPC target node remains constant until the open circuit voltage is sampled again. The open circuit condition is created by turning the input switch 304 OFF.

For example, at the end of the sampling period, the input switch 304 is turned ON again, thereby connecting the voltage at the input node 303 to the switch mode power supply 308. The closed circuit input voltage at node 303 is compared against the MPPC target node voltage via resistors R1 and R2 (350 and 352 respectively). In one embodiment, this difference in voltage is sent as a signal through an amplifier G1 (e.g., transconductance amplifier 346) that provides a voltage at its output and the base of transistor Q2 (336). For example, when the input voltage is below the desired regulation point, the voltage at the output of the transconductance amplifier 346 decreases, allowing the voltage across resistor 334 ($R_{Iset}$) to decrease, thereby decreasing the voltage across resistor 312 (R4). Accordingly, the maximum current provided by the switch mode power supply 308 through the sense resistor $R_{sen}$ (310) is reduced. With the switch mode power supply 308 operated at a lower current, the input current drawn from the input supply (solar panel 302) decreases. Consequently, the voltage at the input node 303 increases (e.g., the excess solar panel current at node 303 charges the input capacitor 306). In one embodiment, balance occurs when the MPPC regulation voltage matches the MPPC Target voltage.

For example, the MPPC control loop is a means whereby the difference of the input voltage from the desired input voltage required for maximum power transfer from the input supply is regulated. The regulation is accomplished through adjustment of the switch mode power supply 308 maximum output current.

In one embodiment, the burst mode control loop overrides several control loops. In one embodiment, the switch mode power supply primarily controls by using a current mode control loop. This loop adjusts the inductor current to an average value to accommodate a desired regulation point. For example, in a power supply typically either voltage or current is regulated. In the case of the battery charger both are regulated. For example, the current is regulated to a maximum value at low battery voltages. Current regulation is then decreased and regulation is then based on the battery voltage as the battery approaches a charged state. In one embodiment another control loop is added for MPPC regulation. In this state the current level regulation of the switch mode power supply 208 itself is overridden to be regulated at a different value in order to maintain an input voltage regulation value. As discussed above, at a low output current level (e.g., through resistor $R_{sen}$ 310) it is more efficient to burst the output switches. For example, the switches are turned ON for a few cycles and then turned OFF. Instead of operating the output switches at low output current, burst mode operates the output switches at higher currents (i.e., but not continuously) such that the average current is the same. In this regard, the regulator 301 is operated near the maximum power point control voltage.

In one embodiment, it is initially determined when to enter burst mode. For example, this is done by determining the charge current (e.g., that flows through $R_{sen}$ 310) via amplifier A4 (322). For example, when the current falls below a predetermined level, amplifier A4 (322) provides a signal indicating the current level is low.

In one embodiment, the MPPC control loop comprises resistor 350 (R1), resistor 352 (R2), amplifier 346 (G1), an output capacitor at the output of the switch mode power supply 308, transistor 336 (Q2), transistor 330 (Q1), multiplier 326, and resistor 312. In one embodiment, when regulating at MPPC regulation with continuous switching and low current is detected at the output, nothing happens (i.e., the system remains in continuous switching). For example, if the input source (e.g., solar panel 302) weakens (e.g., provides less power to the input node 303), then the output current may cause the input voltage to fall. For example, as the voltage at the input node 303 reflected across resistor R2 (352) through resistor R1 (350) "MPPC_IN voltage" drops below an "MPPC_BURST_OFF voltage" (e.g., MPPC_regulation−hysteresis/2) the output switches are turned OFF. It should be noted that the term "MPPT_BURST_OFF" as used herein represents the lower threshold such that when in MPPT, it is the point where the switch mode power supply 308 is disabled. As to the term MPPT_BURST_ON," it represents an upper threshold where the switch mode power supply 308 is enabled. Although not required for symmetry, in one embodiment, hysteresis may be included.

The output switches are turned OFF as burst mode is entered. In one embodiment, the maximum output current is then artificially set higher than what the current would be for MPPC regulation. For this example, the higher maximum output current setting is because the hysteresis comparator A2 (344) output has gone LOW, causing the switch 347 (i.e., on the base of Q2) to be triggered, such that the voltage at the base of transistor Q2 (336) is $V_{Iburst}$. However, the switch mode power supply 308 is OFF so there is no output current. With no output current there is no load on the input supply and the input voltage at node 303 rises. The rate of this rise in voltage is determined by the output of the input supply 302 and the input capacitance $C_{in}$ (306)

It should be noted that there are two "continuous" modes. For example, there is continuous operation of the switch mode power supply 308, which indicates that all the switches are active. However, "continuous" operation with respect to burst mode, relates to switching being allowed.

In one embodiment, when we have entered burst mode regulation and MPPC_regulation node reaches MPPC the voltage level MPPC_BURST_ON node (e.g., MPPC_regulation+hysteresis/2) the switch mode power supply 308 turns ON. For example, the switch mode power supply 308 operates at a fixed maximum current set by voltage level at the $V_{Iburst}$ node. The output current (e.g., through $R_{sen}$ 310) may be larger than the current provided from the input supply, thereby causing the input supply to drop. For example, when the R1/R2 referred input voltage reaches MPPC_OFF the switch mode power supply 308 is again turned OFF and the cycle is repeated. The time the output switches are ON may depend on the input capacitance $C_{in}$ (306), the burst mode current level, and the conditions at the output of the switch mode power supply 308.

Next, we address how to escape out of burst mode. In one embodiment, If the input supply strengthens such that MPPC_regulation never reaches MPPC_BURST_OFF, then the output switches are operated continuously but at the burst mode current level. In one embodiment, in order to exit burst mode operation, a predetermined time is waited until the voltage at the input node 303 is sampled (e.g., by disconnecting from the switch mode power supply 308, as discussed above). For example, during sampling, the regulator 301 is reset out of the burst mode state and at the end of the sample period is restarted without burst mode activated. In one embodiment, if conditions still require burst mode (e.g., the output current is below a predetermined low current threshold and the input voltage is below MPPC_BURST_OFF), burst mode is then reinitiated. Otherwise, the regulator 301 is operated under normal MPPC regulation.

Accordingly, in burst mode the regulator 301 may have the input voltage cycling between MPPC_BURST_OFF and MPPC_BURST_ON. As explained above, the output voltage need not to be used. Indeed the output may be coupled to a battery, which does not change substantially over time.

Figure 4:
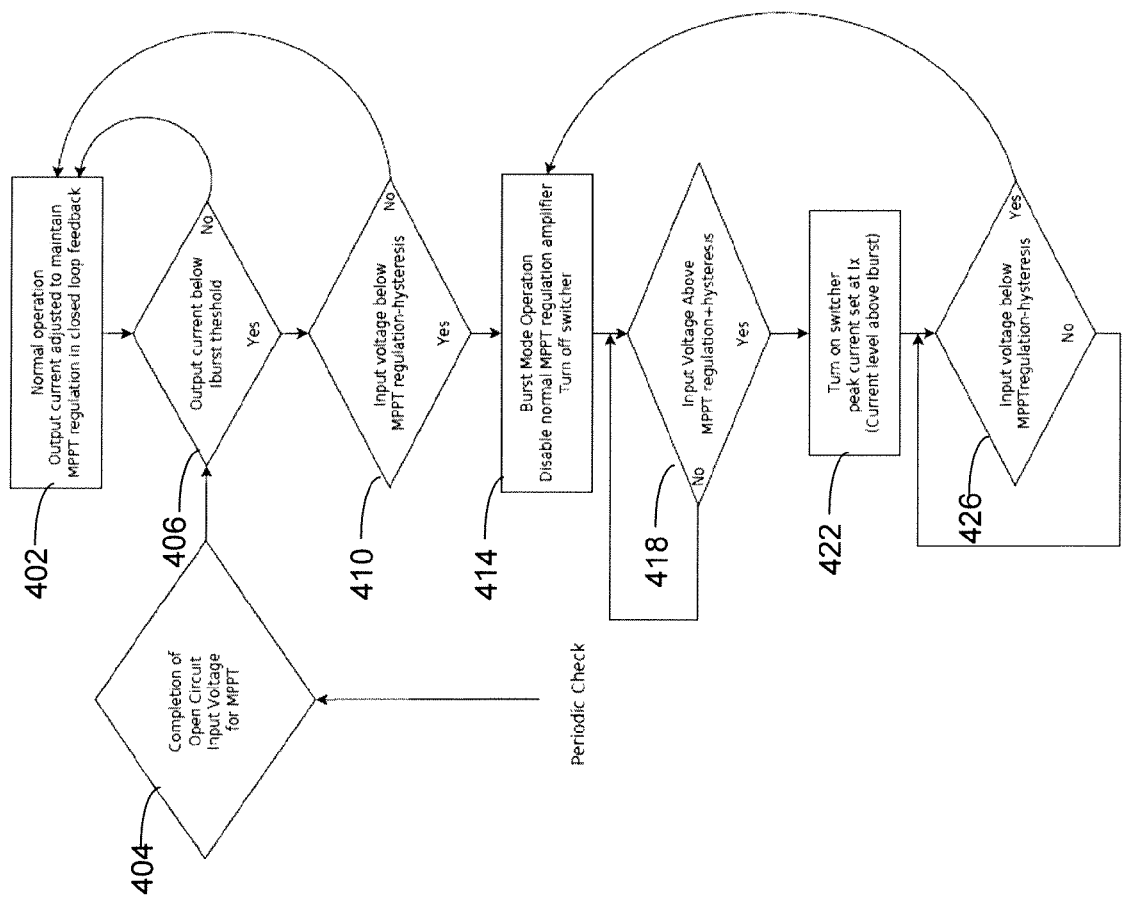
FIG. 4 is an exemplary method of transferring power from a power source to a load efficiently, consistent with an embodiment of the present invention.

With the foregoing overview of an exemplary switching regulator system 300, it may be helpful now to consider a high-level discussion of an exemplary flow that may be used in connection with switching regulator system 300. FIG. 4 illustrates an exemplary method of transferring power from a power source to a load efficiently, consistent with an embodiment of the present invention.

In normal (e.g., continuous mode) operation (402), the output current (e.g., provided to the load of the switching regulator) is adjusted to maintain MPPC regulation in closed loop feedback. In step 406 a determination is made whether the output current (provided to the load of the switching regulator) is below a predetermined threshold ($I_{burst}$). If the output current is not below the predetermined ($I_{burst}$) threshold, the system continues in normal (e.g., continuous) operation (402). For example, if the current is not below the predetermined $I_{burst}$ threshold, it may indicate that the load (e.g., battery) is still charging or the combined battery and load on the battery is higher than required to reach the threshold.

In one embodiment, in step 406, instead of using the output current, the input current (e.g., provided by the input voltage source) is below the predetermined threshold ($I_{burst}$). For example, the input current can indicate what the output current is. In this regard, the relationship between the input current ($I_{in}$) and output current ($I_{out}$) is provided by Equation 1 below:

$$I_{IN} \cong \frac{V_{OUT} \times I_{OUT}}{V_{IN} \times \text{Efficiency}} \quad \text{(Eq. 1)}$$

In step 410, upon determining that the output current is below the predetermined ($I_{burst}$) threshold, it is determined whether the input voltage (e.g., voltage at node 303 of FIG. 3) is below a first input threshold level. In one embodiment, the first input threshold level is an MPPC regulation voltage minus a first hysteresis threshold voltage. The MPPC regulation voltage is adjustable in that it is recalculated on each open circuit sample. For example if the open circuit voltage has changed with temperature then the MPPC regulation voltage tracks that change and maintains a better regulation point. If the input voltage is not below the first input threshold level, the system continues in normal (i.e., continuous) operation (402). For example, if the input voltage is not below the first input threshold level, it may indicate that the power source (e.g., solar panel) is providing sufficient power to the system and the power from the power source is efficiently transferred to the load of the switching regulator (e.g., charging battery).

In step 414, upon determining that the input voltage is below a first input threshold level, the system enters burst mode operation. For example, the normal (e.g., continuous mode) MPPC regulation operation (as discussed in connection with step 402) is disabled. In one embodiment, the MPPC regulation amplifier and/or the switch mode power supply (e.g., 308) are turned OFF. For example, turning OFF these components saves power, which ultimately improves the efficiency in the power transfer between the input source (e.g., solar panel) and the load (e.g., battery).

Next, in step 418, it is determined whether the input voltage is above a second input threshold level. In one embodiment, the second input threshold level is an MPPC regulation voltage plus a second hysteresis threshold voltage. In one embodiment the first hysteresis voltage is equal to the second hysteresis voltage. If the input voltage is not above the second input threshold level, the system remains in burst mode while the switch mode power supply remains OFF. For example, if the input voltage is not above the second input threshold level, it may indicate that the power source (e.g., solar panel) is not ready to provide sufficient power for efficient energy transfer between the input and output of the voltage regulator 301.

In step 422, upon determining that the input voltage is above a second input threshold level, the switch mode power supply is turned ON. For example, the switching of the switch mode power supply resumes, thereby transferring the power from the input (e.g., solar panel) to the output (e.g., battery). In one embodiment, the average peak output current is set at $I_x$, a current level above the predetermined $I_{burst}$ threshold level. Put differently, the peak output current is set above the predetermined $I_{burst}$ threshold when the input voltage is above the second input threshold level.

In step 426, it is determined whether the input voltage is below a first input threshold level. If the input voltage is not below the first input threshold level, the system remains in burst mode while the switch mode power supply is ON (e.g., switching). If the input voltage is below the first input threshold level, the system returns to step 414—burst mode operation with the switch mode power supply OFF (e.g., not switching).

There are several ways to exit the burst mode. In one embodiment, in step 404 the voltage at the input of the switching regulator 301 is measured at open circuit (e.g., when the input switch that provides a path from the power source to the switch mode power supply 308 is OFF. For example, after this step is completed, the burst mode state is removed such that the switch mode power supply 308 returns to normal operation. If the switch mode power supply 308 is subsequently still in a low output current and an input voltage below the BURST_OFF state as indicated previously, then burst mode is entered. The checking of open circuit voltage may be done periodically. In this regard, the state of the burst mode is also checked periodically. In one embodiment, there need not be a link between the open circuit voltage measurement and burst mode checking. A separate timer could be used that would set the interval at which burst mode operation would be reevaluated. Another possible scheme could monitor the amount of time that the switcher is operating above the MPPC_BURST_ON threshold and reset burst mode after a set time.

The components, steps, features, objects, benefits and advantages that have been discussed herein are merely illustrative. None of them, nor the discussions relating to them, are intended to limit the scope of protection in any way. Numerous other embodiments are also contemplated. These include embodiments that have fewer, additional, and/or different components, steps, features, objects, benefits and advantages. These also include embodiments in which the components and/or steps are arranged and/or ordered differently. For example, will be understood that the flow in FIG. 4 is merely an example and that the method can of course be performed in other orders or with more steps as well. Further, bipolar transistors (e.g., PNP or NPN) can be used instead of MOS transistors. A PNP may be used instead of NPN, and a PMOS may be used instead of NMOS. Accordingly, it is intended that the invention be limited only in terms of the appended claims.

What is claimed is:

1. A switching regulator that supplies output current at a regulated voltage level to a load, the switching regulator being operable in a burst mode, the switching regulator comprising:
   an input node;
   an output node coupled to the load;
   a switch mode power supply coupled to the load; and
   a control circuit coupled between the input node and the switch mode power supply, wherein the control circuit is configured to determine when to enter burst mode, in which switching elements of the switch mode power supply provide output current to the load on an intermittent aperiodic basis, based on a voltage at the input node that is below a predetermined threshold level and at least one of (i) a current at the input node or (ii) the output current being below a predetermined current threshold.

2. The switching regulator of claim 1, further comprising an input switch coupled between the input node and the switch mode power supply.

3. The switching regulator of claim 2, wherein the input switch is configured to isolate the switch mode power supply from the input node to sample an open voltage at the input node.

4. The switching regulator of claim 1, wherein the switch mode power supply comprises:
   one or more output switches configured to turn ON and OFF the output current to the load; and
   an inductor arranged to provide the output current to the load.

5. The switching regulator of claim 1, wherein the control circuit is configured to control a maximum current output of the switch mode power supply during a maximum power point control (MPPC) regulation and during the burst mode.

6. The switching regulator of claim 1, wherein the switching regulator is one of a buck, boost, or buck-boost regulator.

7. The switching regulator of claim 2, further comprising an input sampling block coupled between the input node and the input switch, wherein the input sampling block is configured to sample the input voltage when the input switch is open and when the input switch is closed.

8. The switching regulator of claim 7, wherein the input sampling block comprises:
   a digital to analog converter (DAC) sample and hold circuit;
   an open circuit amplifier having a first input coupled to an output of the DAC sample and hold circuit and a second input operatively coupled to the input node; and
   a clock coupled to an input of the DAC sample and hold circuit.

9. The switching regulator of claim 1, wherein the switching regulator is a current-mode synchronous switching regulator.

10. The switching regulator of claim 1, further comprising a current measurement circuit configured to measure the output current.

11. The switching regulator of claim 10, wherein the current measurement circuit comprises a sense resistor having a first node coupled to an output of the switch mode power supply and a second node coupled to the load.

12. The switching regulator of claim 11, wherein the switch mode power supply further comprises:
   a first sense node coupled to the first node of the sense resistor; and
   a second sense node coupled to the second node of the sense resistor.

13. The switching regulator of claim 12, further comprising a current limit resistor coupled between the second node of the sense resistor and the second node of the sense node of the switch mode power supply, wherein the current limit resistor is configured to limit an amount of output current.

14. The switching regulator of claim 13, further comprising a current limit amplifier configured to impose an artificial voltage across the current limit resistor to limit the output current.

15. The switching regulator of claim 1, wherein a voltage at the output node is substantially fixed by the load.

16. In a switching regulator that provides an output current to a load at a regulated voltage and is operable in a burst mode, a method for operating the switching regulator comprising:
   determining the output current;
   operating in a continuous mode when the output current is not below a predetermined $I_{burst}$ current threshold and when an input voltage is not below a predetermined first input threshold level; and
   determining the input voltage;
   entering a burst mode, in which switching elements of a switch mode power supply of the switching regulator provide output current to the load on an intermittent aperiodic basis, when the input voltage is below the predetermined first input threshold level.

17. The method of claim 16, further comprising:
   remaining in burst mode and turning OFF the switching elements of the switch mode power supply that provide the output current to the load when the input voltage is not above a second input threshold level; and
   turning ON the switching elements of the switch mode power supply that provide the output current to the load when the input voltage is above the second input threshold level.

18. The method of claim 17, further comprising setting a peak output current above the predetermined $I_{burst}$ threshold when the input voltage is above the second input threshold level.

19. The method of claim 17, further comprising:
   remaining in burst mode with the switching elements of the switch mode power supply that provide the output current to the load ON when the input voltage is not below the first input threshold level; and
   going back to the step of entering the burst mode operation and turning OFF the switching elements of the switch mode power supply that provide the output current to the load when the input voltage is below the first input threshold level.

20. The method of claim 16, further comprising:
   isolating the switch mode power supply from the input voltage and measuring the input voltage at an open circuit;
   measuring the input voltage at a closed circuit by removing the isolation; and
   comparing the voltage difference between the measurement of the input voltage at the open circuit and at the closed circuit.

21. The method of claim 20, wherein the open circuit and closed circuit measurements of the input voltage are performed at predetermined intervals.

22. The method of claim 16, wherein turning OFF the switching elements of the switch mode power supply that provide the output current to the load includes turning OFF one or more regulation amplifiers.

23. The method of claim 17, wherein the first input threshold level is a maximum power point control (MPPC) regulation voltage minus a first hysteresis threshold voltage.

24. The method of claim 23, wherein the second input threshold level is the maximum power point control (MPPC) regulation voltage plus a second hysteresis threshold voltage.

25. The method of claim 24, wherein the first hysteresis voltage is equal to the second hysteresis voltage.

26. The method of claim 16, wherein the entering of the burst mode comprises entering the burst mode when the input voltage is below the first input threshold level and the output current falls below the predetermined $I_{burst}$ current threshold.

27. The switching regulator of claim 1, wherein the control circuit is further configured to:
   determine to enter burst mode when the voltage at the input node is below a first input threshold level and at least one of the current at the input node and the output current is below the predetermined current threshold;
   maintain operation of the switching regulator in the burst mode and turning OFF the switching elements of the switch mode power supply that provide the output current to the load when the input voltage is not above a second input threshold level; and
   turn ON the switching elements of the switch mode power supply that provide the output current to the load when the input voltage is above the second input threshold level.

28. The method of claim 16, wherein the predetermined first input threshold level is set prior to entering the burst mode, and the predetermined first input threshold is set based on an open circuit voltage at the input of the switching regulator.

* * * * *